March 5, 1929.  A. H. BERNTSON ET AL  1,704,423
EAR TAG
Filed Aug. 2, 1926
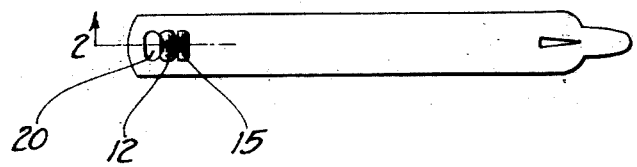
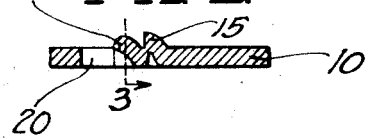
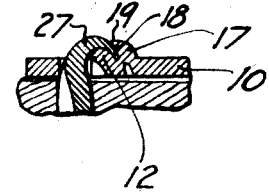
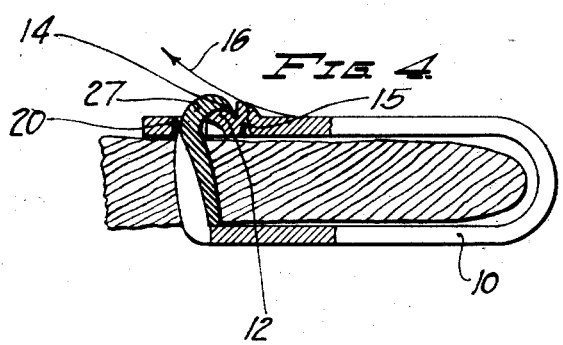
Inventor
A. H. BERNTSON,
C. J. ZIMMERMAN,
By
Attorney Patented Mar. 5, 1929.

1,704,423

UNITED STATES PATENT OFFICE.

ARTHUR H. BERNTSON AND CLIFFORD J. ZIMMERMAN, OF SALT LAKE CITY, UTAH.

EAR TAG.

Application filed August 2, 1926. Serial No. 126,475.

This invention relates to an improved ear tag of the kind generally used for identifying sheep and cattle. The improvement consists in providing means for guarding the usual clinched tongue of such a tag, and more especially of that tag for which U. S. Patent No. 1,510,083 was granted to Arthur H. Berntson, one of the present applicants, under date of Sept. 30, 1924.

The principal objects of this invention are:

First. To prevent the clinched tag from becoming detached from the ear accidentally.

Second. To provide a secure bearing under the clinched tongue.

Third. To prevent the clinched tongue of the tag from being accidentally crushed or lifted.

Fourth. To provide the improved features simply and at virtually no extra expense above the cost of the ordinary tag.

Ear tags of the type to which this improvement is applicable, are usually formed of metal strips, each strip having a pointed tongue at one end and an eyelet at the other. In use, the strip is bent into the form of a closed link, the tongue being caused to pass through the eyelet, and after so passing through, the tongue is curled to form a clinch for holding the link in the closed form.

We attain the objects previously outlined, by providing a convex seat for the curled tongue which naturally has a concave inner surface, the said seat conforming substantially to the curvature of the inside of the tongue after it is bent into the clinched form. Immediately in front of the clinched tongue and adjacent its seat is located a guard consisting of a raised portion or lug so shaped that any outside object, which otherwise might strike the tongue, is caused to glance off before contacting the tongue.

Animals are prone to detach and lose the ear tags by stripping them off in contact with outside or foreign objects such as trees, fences, and so on, or by being herded with other animals. The tip of the tongue is especially likely to be caught by some opposing object and thereby be lifted or pried up so as to finally cause the tag to become unfastened. In the present improvement, the tip of the tongue lies deep down in the valley between the seat and the aforesaid guard lug, whereby the tongue is effectually protected against accidental loosening.

In the drawing, which illustrates the present improvement applied to the tag forming the subject of the previously mentioned patent, Fig. 1 represents a plan of the tag in the flat form, before it is bent into shape for attaching to an animal's ear;

Fig. 2, an enlarged section on line 2, Fig. 1;

Fig. 3, a section on line 3, Fig. 2;

Fig. 4, a side elevation, partly in section on the longitudinal center line, showing the tag substantially in the position it occupies on an animal's ear, this figure being drawn to the same scale as Figs. 2 and 3; and Fig. 5, a fragmentary section showing a modification.

Referring to the drawing, the numeral 10 (Fig. 4) indicates the body of the tag after it has been attached to the ear of an animal in the usual manner. The tongue 27 has been curled by the action of the usual pliers (not shown) used in attaching the tags. In the present instance, instead of having no support underneath the curled tongue, there is provided, on the contrary, the embossed seat 12 contiguous to the eyelet 20, the seat being firmly contacted by the curved under surface of the tongue.

The tongue, and especially its tip 14, is effectually guarded against being opened or lifted, by the guard lug 15, the upper surface of which is so formed that any foreign object striking it, is caused to glance off, substantially as indicated by the arrow 16, the foreign object being thus harmlessly deflected.

Obviously, the seat 12 and the lug 15 may be embodied in the structure of the tag forming the subject of the previously mentioned Patent No. 1,510,083, without incurring any appreciable additional expense in manufacturing.

The modification shown in Fig. 5, has the guard lug 17 with its inner face 18 inclined, for the purpose of bringing the point 19 located very close to the upper surface of the tongue 27 and overhanging the same, which feature might in some cases prove desirable.

While we have shown and described one specific embodiment of our invention, it will be understood that minor changes may be made without departing from the spirit thereof as defined in the claims.

Having fully described our invention, what we claim is:

1. In an ear tag having a tongue and a portion with an eyelet therein, the said tongue being arranged to pass through the eyelet and to be clinched after so passing through, the combination with the said eyelet portion, of an embossed seat contiguous to the eyelet, the outer surface of the said seat substantially contacting the inner surface of the said clinched tongue, and a guard adjacent the seat, said guard and said seat being integral with each other.

2. An ear tag having a tongue, a portion in which is defined an eyelet, the said tongue being arranged to pass through the eyelet and to be clinched after so passing through, a convex seat adjacent the eyelet, said seat substantially contacting the surface of the said clinched tongue, and a guard adjacent the said seat, the said seat and guard being integral with each other and defining a valley within which is located the tip of the said clinched tongue.

3. A tag having a curled tongue, a strip-end engaging said tongue, a guard in front of the tip of the said tongue, said guard being integral with the said strip-end, and a valley defined back of said guard, said valley located on the outside of said tag, and the said tip lying in the said valley.

4. In a tag, a curled tongue having a tip with an inclined outer surface, a strip-end engaging said tongue, and a guard in front of said tongue, said guard having an overhanging portion following substantially the inclination of said outer surface to form a valley on the outside of said tag for receiving said tip, said guard further, being integral with said strip-end.

In testimony whereof, we sign our names hereto.

ARTHUR H. BERNTSON.
CLIFFORD J. ZIMMERMAN.